Feb. 21, 1956     H. R. HASTINGS     2,736,003
GEAR SHIFT POSITION INDICATOR MECHANISM
Filed Sept. 11, 1952
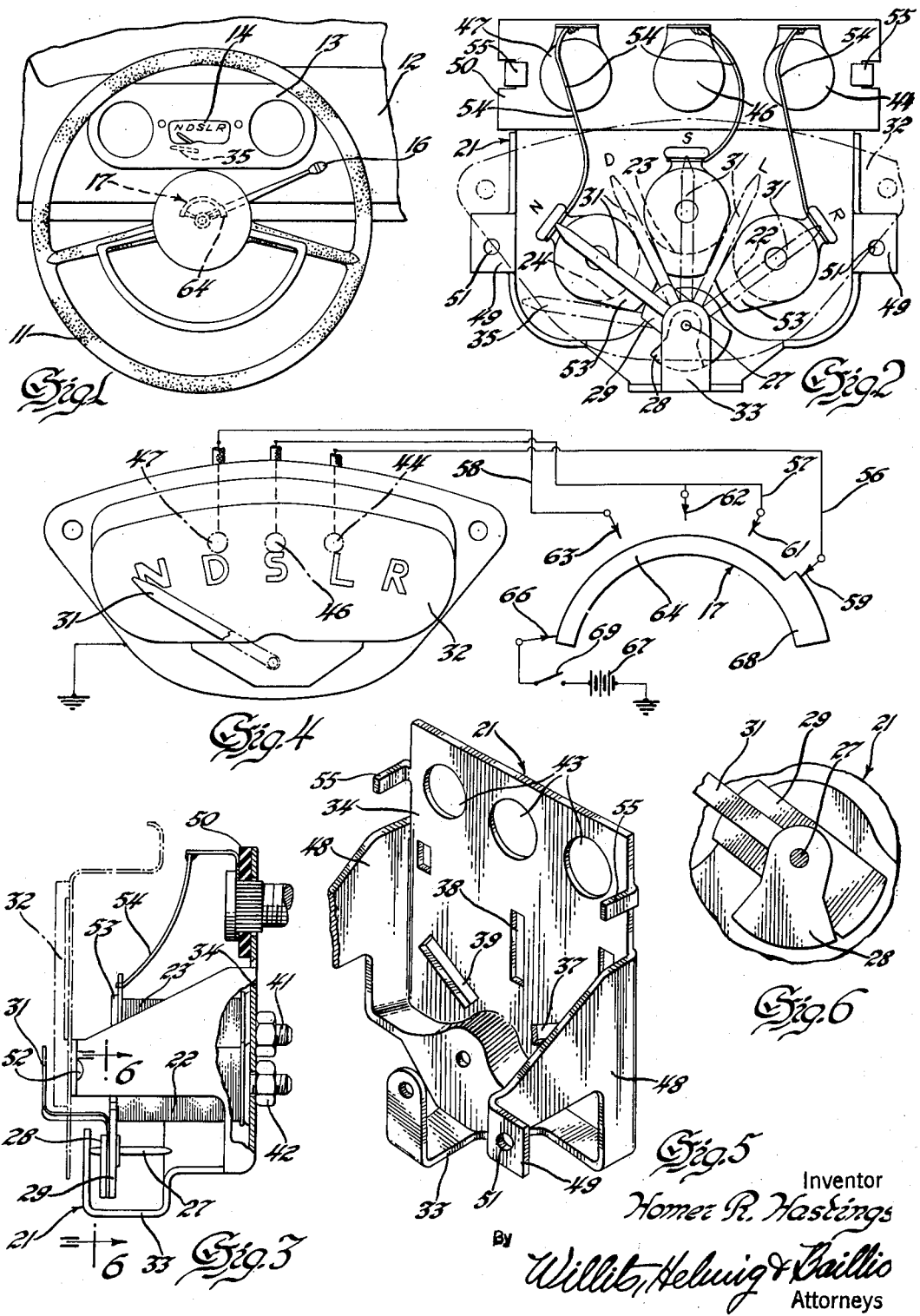
Inventor
Homer R. Hastings
By
Willits, Helwig & Baillio
Attorneys

United States Patent Office 2,736,003
Patented Feb. 21, 1956

2,736,003

GEAR SHIFT POSITION INDICATOR MECHANISM

Homer R. Hastings, Flint, Mich., assignor to General Motors Corporation, Detroit, Mich., a corporation of Delaware Application September 11, 1952, Serial No. 309,043

7 Claims. (Cl. 340—52)

The present invention relates generally to a transmission position indicator. More particularly the invention relates to an indicator remotely located relative to the transmission selector lever.

In vehicles utilizing automatic transmissions, it is normal to provide an indicator mechanism which indicates to the driver the operative condition of the transmission, i. e. neutral, drive, low, reverse, etc., and which conditions are usually represented on an indicator dial by letters such as N, D, L and R. The normal practice has been to proximately locate the indicator relative to the transmission selector lever on the steering column.

It is presently proposed to provide a system whereby the indicator mechanism may be located in the instrument panel and remotely controlled by the selector lever. So positioning the indicator has the advantage of locating it within the same general visual range as the other vehicle instruments. In addition, the already available instrument panel illumination system may be utilized to illuminate such an indicator.

Frequently, mounting a transmission position indicator on the steering column has partially obscured the operator's view of the instrument panel, consequently, removing the indicator to the instrument panel eliminates any such possible impairment of vision. An equally desirable result of remotely mounting such an indicator is an unencumbered and simplified steering column.

In organizing the various vehicle instruments requisite to safe vehicle operation, it is more efficient to be able to assemble the instruments within a reasonably compact space or cluster, thus the fewer instruments or indicating devices that are isolated from the main assemblage the more reasonable will be the cost of assembling the instrument panel. It is to facilitate a more efficient instrument organization to which the subject invention is in part devoted.

Separating the transmission position indicator from the transmission selector lever has necessitated the use of a remotely controlled indicating mechanism. A relatively simple type of tele-metering or repeating system has been developed which generally includes a transmission selector lever, a pointer and dial asesmbly preferably mounted upon the instrument panel and motion transmitting mechanism intermediate the lever and assembly and operatively connected respectively thereto. Through such a combination the position of the transmission selector lever may be converted to a pointer position on an indicator dial remotely disposed relative to the lever.

Thus it is generally an object of the present invention to provide a transmission position indicator mcehanism remotely located from and controlled by a transmission selector lever.

It is a particular object to provide an electrically controlled indicating mechanism which includes a multi-position switch associated with a transmission selector lever and which switch variously directs electrical impulses to ultimately move a pointer to various positions on an indicator dial remotely located with respect to said lever.

It is also an object of the invention to provide a plurality of electro-magnetic coils which are variously energized by a multi-position switch and which coils in turn cause the movement of an indicator mechanism to indicate to a vehicle operator the operative condition of a transmission.

It is a further object to provide an indicator mechanism which includes a supporting bracket, a dial having indicia thereon and supported by said bracket, a pointer pivotally mounted upon the bracket, an armature fixed to said pointer and a plurality of electro-magnetic coils disposed about said armature and a multi-position switch adapted to selectively energize the coils to cause the armature to rotate and respectively align the pointer with the indicia.

Further objects and advantages appear in the following description and drawings in which the invention is illustrated.

Figure 1 is a partial view of a vehicle instrument panel and steering mechanism embodying the present indicating system.

Figure 2 is a front elevation of the indicator-follower mechanism and supporting bracket with the indicator dial removed.

Figure 3 is a side elevational view showing the general arrangement of parts as mounted on a support bracket structure.

Figure 4 is a schematic showing of the control switch and electrical system as connected to the indicator assembly.

Figure 5 is a perspective view of the supporting bracket.

Figure 6 is a view along line 6—6 of Figure 3 showing a front view of the armature-counter-weight-pointer subassembly.

A portion of a vehicle passenger compartment is shown in Figure 1 and includes a steering wheel 11, an instrument panel 12 and instrument cluster indicated generally at 13. Within the instrument cluster 13 is a transmission position indicator 14 which visually indicates to the operator the operative condition of the vehicle transmission. Mounted upon the steering wheel column is a transmission selector lever 16 through which the operator conditions the transmission for driving operation. Also mounted upon the steering column is a multi-position switch 17, a portion of which is connected to the selector lever for controlling indicator 14 in accordance with the lever position.

The indicator 14, as best seen in Figures 2 and 3, includes a bracket 21 having three electro-magnetic coils 22, 23, and 24 adjustably mounted thereupon. Pivotally mounted on bracket 21 below the coils is a spindle 27 having a counter-weight 28, an armature 29 and a pointer 31 secured thereto. The armature is located within the respective magnetic fields of the coils such that by energizing various coils or combinations of coils the armature will rotate carrying spindle 27, counter-weight 28, and pointer 31 therewith. Thus pointer 31 will assume various positions depending upon which of the coils are energized. Also adapted to be mounted upon the bracket is an indicator dial 32.

The subject indicator mechanism has been designed for use with transmissions having as many as four possible operating conditions as well as neutral. Such conditions are frequently designated on the indicator dial 32 by letters such as N, D, S, L and R. The letters as used representing Neutral, Drive range, Super (special performance) range, Low range, and Reverse.

A U-shaped trunnion element 33 depends from the lower edge of bracket 21. Horizontally supported within trunnion element 33 is the spindle 27 adapted to rotate about an axis substantially normal to the back wall 34 of the bracket. Radially disposed relative to the spindle axis are a plurality of slots 37, 38 and 39 formed in bracket wall 34. The coils through studs 41 and nuts 42 are adjustably supported within the slots. The coils are suitably insulated from the bracket by insulators 45. A plurality of holes 43 are provided in bracket 21 in order that the latter may be conveniently hung on the inner or forward side of the instrument panel by terminal studs 44, 46 and 47. To insure proper operation of the indicator, it is obvious that the terminal studs must be insulated from the bracket 21. To provide such insulation the studs are pressed into a piece of insulating material 50, as will be seen in Figure 3, which is in turn secured to the bracket by crimping ears 55. Projecting forwardly from the vertical edges of the bracket are a pair of brace members 48 having flange portions 49 formed at the outer ends of the braces. The flanges are suitably perforated at 51 in order to secure dial 32 thereagainst by means of rivets 52.

Coils 22, 23 and 24 are identical in construction so far as is practical. The coils are wound in the same direction and to simplify calibration they are wound with the same number of turns. Thus each coil as constructed has substantially the same potential field strength. Secured on the ends of each coil is a coil plate 53, the lower end of which is proximately spaced from armature 29. Terminal studs 44, 46 and 47 are connected to the coils through lead wires 54.

Electrical leads 56, 57 and 58 connect the terminal studs with switch 17. The switch includes a plurality of parallel-related fixed contact points 59, 61, 62, 63 and a rotatable arcuate contact member 64. A contact point 66 leads from a source of power, such as a battery 67, and is in constant engagement with contact member 64 and provides electrical energy for the system. The remaining contact points are adapted to be selectively engaged by member 64. Contact between the contact points and the arcuate contact member is made through a raised portion 68 on the contact member. As the member 64 is selectively rotated, portion 68 engages the various contact points. The length of raised portion 68 is such as to enable the contact member to be simultaneously engaged with mutually adjacent contact points.

Contact 59 is connected to coil 22 through lead 56. Contacts 61 and 62 are connected in parallel to coil 23 through lead 57. Contact 63 is connected by lead 58 to coil 24.

Thus as the transmission selector lever 16 is rotated to its various positions the arcuate contact member rotates therewith and through raised portion 68 engages the various fixed contact points which in turn energize their respective coils.

As noted above, a spindle 27 is mounted for rotation in trunnion 33. Armature 29 is fixed upon the spindle in the same general vertical plane as coil plates 53 and slightly spaced from the lower edge of said plates. The armature is an elongated magnetic or polarized member which assumes various radial positions relative to the spindle axis in accordance with coil energization. While a polarized armature is used in this instance, it is possible to utilize a soft iron armature if the magnetic circuit is changed somewhat to prevent the pointer from getting 180° out of phase relative to the dial. Pointer 31 is likewise secured to spindle 27 and rotates therewith under the influence of the armature and the coils.

To prevent any of the coils from being energized when the vehicle is not being operated, a vehicle ignition switch 69 is inserted in the power circuit intermediate battery 67 and power contact 66. Thus when the vehicle motor is shut off the indicator mechanism will not function.

Counter-weight 28 is fixed to spindle 27 and radially offset relative thereto, as will be seen in Figures 1 and 6, to rotate pointer 31 off dial 32 to a position indicated generally at 35 when ignition switch 69 is opened. Pointer 31 will not, therefore, be viewable by the operator with the ignition switch opened regardless of the disposition of the transmission selector lever. By thus positively forcing the pointer off the dial when the ignition switch is open, a faulty indicator reading is precluded and the operator is unlikely to start the vehicle assuming the transmission to be in a given condition when it is in fact otherwise conditioned. The aforementioned proviso requires that the operator first turn on the ignition and then view the indicator to determine the operative condition of the transmission.

The switch and indicator, as seen in Figure 2, operate as follows, it being understood that any switch movement is under the control of the transmission selector lever 16. Considering the arcuate contact member in the position shown in Figure 4, raised portion 68 engages contact 59 which energizes coil 22 creating a concentrated magnetic field passing through the center of the coil and causing the armature to align with the coil. In this position the pointer aligns with letter R on the indicator dial. In the next counter-clockwise position, portion 68 simultaneously engages contacts 59 and 61 energizing coils 22 and 23. Since both coils are now energized, the respective magnetic fields tend to fan out and meet to produce a flux and field strength concentration intermediate the coil members. Armature 29 and pointer 31 will now be rotated into alignment with the translated field intermediate coils 22 and 23 and thus point to letter L on the indicator dial. Continuing in a counter-clockwise direction, contact portion 68 breaks contact with contact point 59 de-energizing coil 22 and engages points 61 and 62. Since contacts 61 and 62 connect with common lead 57 only coil 23 is energized and the armature aligns itself therewith. The pointer in this case points to letter S. As the selector lever rotates arcuate contact still further, portion 68 breaks contact with contact 61 and engages contacts 62 and 63. In this position coil 23 remains energized and coil 24 through its contact point 63 becomes charged. Once again armature 29 aligns itself in a position intermediate a pair of energized coils and in this instance the pointer aligns with letter D on the dial. In the final position, portion 68 disengages with contact 62 and solely engages contact 63, thus energizing only coil 24. In this position the armature aligns with coil 24 and the pointer with letter N on the dial.

It is apparent, therefore, that by providing a unique multi-position switch and follower mechanism it is possible to combine the singular and the plural energization of the electro-magnetic coils to cause the indicator pointer 31 to assume a number of positions relative to dial 32 in excess of the number of coils provided.

While the coils are intended to have the same field strengths, the strength may vary slightly due to certain inherent characteristics or misalignments. If there is a variation in field strength between two adjacent coils then the stronger field will preponderate and the armature will assume a position closer to the stronger coil and the pointer will not point directly to one of the dial indicia. To avoid any such indefinite positioning of the pointer, the coils have been made radially adjustable relative to the spindle axis. In this way the relative field strengths of the coils may be varied by moving a coil radially inwardly or outwardly in its slot. As an illustration, if coil 22 should be exerting a stronger influence on the armature than coil 23 when the selector lever has the transmission conditioned for low operation, the pointer would be pointing somewhere between L and R on the dial and the operator could not be certain in which direction the vehicle is likely to move. To correct this situation, nut 42 on coil 22 would be loosened and the coil moved outwardly until its influence equalled that of coil 23 on the armature and the pointer centered directly on letter L. In this way pointer 31 may be made to align exactly with the dial indicia to truly indicate the operative condition of the transmission.

While a single embodiment has been disclosed, it is possible for the flow of electrical energy variously emanating from the multi-position switch 17 to actuate other than electro-magnetic coils, as shown, to selectively position pointer 31 relative to the indicia on dial 32. It is within the intended scope of the present invention to substitute for the electro-magnetic motor arrangement disclosed an hydraulic or a pneumatic motor controlled by the multi-position switch 17. It would thus be possible within the general teaching of the invention to provide, in lieu of the electro-magnetic system particularly shown and described, an equivalent electro-hydraulic or electro-pneumatic follower mechanism to control the operation of a remotely located indicator device.

While a particular embodiment of the present invention has been shown and described for the purpose of most simply illustrating the invention, it is apparent that various structural modifications may be made within the scope of the teachings of the invention.

I claim:

1. A transmission position indicating device including in combination a transmission selector lever, a multi-position switch actuatable by said lever, a source of electrical energy connected to said switch, an electrically operated follower mechanism controlled by and remotely located from said switch, said mechanism including a supporting bracket, a plurality of electro-magnetic members mounted upon said bracket, a plurality of leads electrically connecting said members with said switch, a pointer pivotally supported by said bracket, said pointer being selectively positionable in response to the energization of said members individually and in combination, said bracket including means for individually adjusting the position of said members relative to said pointer for altering the magnetic field produced by said members when energized in combination.

2. A transmission position indicating device including in combination a transmission selector lever, a multi-position switch actuatable by said lever, a source of electrical energy connected to said switch, an electrically operated follower mechanism controlled by and remotely located from said switch, said mechanism including a supporting bracket, a spindle pivotally supported by said bracket, a pointer fixed to the spindle, an armature fixed upon said spindle, a plurality of slots in said bracket, an electro-magnetic coil mounted in each of said slots, electrical leads connecting said coils with said switch, said armature being rotatable in response to the energization of said coils, said coils being adjustable within said slots to vary the effective magnetic field of each of the coils relative to said armature.

3. A transmission position indicating device including in combination a transmission selector lever, a multi-position switch actuatable by said lever, a source of electrical energy connected to said switch, an electrically operated follower mechanism controlled by and remotely located from said switch, said mechanism including a bracket, a spindle pivotally supported by said bracket, a pointer fixed upon said spindle, an armature likewise fixed upon said spindle, a plurality of slots in said bracket radially disposed relative to said spindle, a plurality of electro-magnetic coils mounted in said slots, said armature being within the respective magnetic fields of said coils, electrical leads connecting said coils with said switch, the armature-spindle-pointer assembly being rotatable to a plurality of positions in response to the selective energization of said coils and a locking means associated with each of said coils permitting radial adjustment of each coil relative to said armature to vary its effective magnetic influence on said armature.

4. A transmission position indicating device including in combination a transmission selector lever, a multi-position switch actuatable by said lever, a source of electrical energy connected to said switch, a second switch for disconnecting said electrical energy from said multi-position switch, an electrically operated follower mechanism controlled by and remotely located from said switch, said mechanism including a supporting bracket, a dial mounted upon said bracket, a spindle pivotally supported by said bracket, a pointer fixed to the spindle and a plurality of electro-magnetic coils mounted upon the bracket adjacent said spindle, said spindle and pointer being rotatable in response to the selective energization of said coils and a counter-weight mounted upon the spindle, said weight being adapted to rotate said spindle off the dial when the source of electrical energy is disconnected from said multi-position switch.

5. A transmission position indicating device including in combination a transmission selector lever, a multi-position switch actuatable by said lever, a source of electrical energy connected to said switch, a second switch adapted to interrupt the flow of electrical energy to the multi-position switch, an electrically operated follower mechanism controlled by and remotely located from said switch, said mechanism including a bracket, a dial mounted upon said bracket, a spindle pivotally supported by said bracket, a pointer fixed upon said spindle and adapted to traverse said dial, a polarized armature fixed upon said spindle, a counter-weight likewise fixed upon said spindle, said counter-weight being adapted to rotate said pointer off said dial upon the interruption of the flow of electrical energy to said multi-position switch, a plurality of slots in said bracket radially disposed relative to said spindle, a plurality of electro-magnetic coils mounted in said slots, said armature being within the magnetic field of said coils, electrical leads connecting said coils with said switch, said armature being rotatable to a plurality of positions in response to the selective energization of said coils and a locking means associated with each of said coils permitting radial adjustment of each coil relative to said armature to vary its magnetic influence on said armature.

6. A transmission position indicator including a transmission selector lever, selective switch means actuatable by said lever, a source of electrical energy connected to said selective switch means, disconnect switch means connected between said source and said selective switch means, electrically responsive follower means operatively connected to said selective switch means and disposed apart therefrom, said follower means comprising a support bracket, indicator means mounted upon said bracket and including a spindle having pointer means pivotally secured thereto, a plurality of electro-magnetic members mounted upon said bracket and annularly disposed about said spindle, said pointer means being responsive to the selective energization of said electromagnetic members individually and in combination for indicating transmission conditions selected by said transmission selector lever, and means for adjusting said electro-magnetic members radially with respect to said spindle for altering the magnetic field produced by energization of adjacent of said members and to position said pointer means between adjacent energized electromagnetic members as desired.

7. A transmission position indicator including a transmission selector lever, selective switch means actuatable by said lever, a source of electrical energy connected to said selective switch means, disconnect switch means connected between said source and said selective switch means, electrically responsive follower means operatively connected to said selective switch means and disposed apart therefrom, said follower means including a plurality of electromagnetic members having indicator means disposed adjacent thereto, said indicator means being responsive to the selective energization of said electromagnetic members for indicating transmission conditions selected by said lever, and means connected to said indicator means for repositioning said indicator means in an original removed position when said disconnect switch means is actuated.

References Cited in the file of this patent

UNITED STATES PATENTS

| | | |
|---|---|---|
| 1,366,832 | Pierce | Jan. 25, 1921 |
| 1,581,383 | Butusov | Apr. 20, 1926 |
| 1,735,623 | Walker | Nov. 12, 1929 |
| 2,375,654 | Howell | May 8, 1945 |
| 2,610,518 | Goedeke et al. | Sept. 16, 1952 |